(12) United States Patent
Jarvis (10) Patent No.: US 9,361,187 B2
(45) Date of Patent: Jun. 7, 2016

(54) FILE SYSTEM METADATA CAPTURE AND RESTORE

(71) Applicant: Quantum Corporation, San Jose, CA (US)

(72) Inventor: Ben Jarvis, Mendota Heights, MN (US)

(73) Assignee: Quantum Corporation, San Jose, CA (US)

( * ) Notice: Subject to any disclaimer, the term of this patent is extended or adjusted under 35 U.S.C. 154(b) by 249 days.

(21) Appl. No.: 14/071,215

(22) Filed: Nov. 4, 2013

(65) Prior Publication Data

US 2015/0127619 A1 May 7, 2015

(51) Int. Cl.
*G06F 11/14* (2006.01)
*G06F 17/30* (2006.01)

(52) U.S. Cl.
CPC ...... *G06F 11/1458* (2013.01); *G06F 17/30327* (2013.01)

(58) Field of Classification Search
CPC .................................................. G06F 11/1458
USPC ........................................................ 707/625
See application file for complete search history.

(56) References Cited

U.S. PATENT DOCUMENTS

| | | | | |
|---|---|---|---|---|
| 6,105,018 A * | 8/2000 | Demers | ............. | G06F 17/30312 |
| 7,318,135 B1 * | 1/2008 | Tormasov | ........... | G06F 11/1456 707/999.202 |
| 7,769,719 B2 * | 8/2010 | Everhart | ............. | G06F 11/2094 707/651 |
| 8,341,130 B2 * | 12/2012 | Kaplan | ............... | G06F 17/3007 707/694 |
| 8,429,133 B2 * | 4/2013 | Lahiri | ............... | G06F 17/30327 707/665 |
| 2003/0172094 A1 * | 9/2003 | Lauria | ............... | G06F 17/30117 |
| 2013/0318036 A1 * | 11/2013 | Shah | ...................... | G06Q 50/01 707/609 |
| 2014/0019413 A1 * | 1/2014 | Braam | ............... | G06F 11/1471 707/625 |

* cited by examiner

*Primary Examiner* — Pierre Vital
*Assistant Examiner* — Alicia Antoine
(74) *Attorney, Agent, or Firm* — Eschweiler & Associates, LLC (57) ABSTRACT

Example apparatus and methods create and maintain a functional mirror of file system metadata for an active file system. The functional mirror may be implemented as a set of database tables that allow a journal functionality for information received from the active file system. Example apparatus and methods also restore the file system metadata from the functional mirror. Mirror creation and maintenance can operate in parallel. Mirror maintenance and metadata restore can also operate in parallel. The functional mirror may be created primarily using a systematic, system-wide, multi-threaded crawler approach whose results are updated using an event-driven approach that accounts for changes that may make obsolete information acquired during the crawler approach. The metadata may be restored using a systematic, system-wide, multi-threaded crawler approach acting together with an event-driven approach that restores certain files out of order as they are needed.

16 Claims, 10 Drawing Sheets

FILE SYSTEM METADATA CAPTURE AND RESTORE

BACKGROUND

File systems store files and store information about files. The information stored in files may be referred to as data. The information about files may be referred to as metadata. The metadata may include, for example, a file name, a file size, a file parent, a file descendant, a file access time, a file owner, file permissions, and other information. Some of the metadata for an individual file may be stored in a data structure known as an inode. The inodes and metadata for a file system may also be stored collectively. The metadata has both structure and content. For example, the content (e.g., metadata) may be stored in a set of data structures (e.g., btrees). When the metadata is stored in one or more trees (e.g., btrees), there may be a root inode associated with the top of the set of trees. When the data in a file or about a file changes, a file system may want to update the metadata about that file. For example, if the contents of a file are changed, the file system may want to memorialize the time at which the change was made and by whom the change was made.

A file system organizes and makes files available in, for example, the familiar hierarchical directory, sub-directory, file structure. A shared disk file system may run on hosts that are connected to the same disk array on a storage area network (SAN). A shared disk file system may hierarchically store large data sets on disk, on tape, and in other locations. The tape may be on-line in a data center and off-line in a vault. Having both on-line and off-line tape facilitates economizing on the costs of storage while allowing for large scale data retention and archiving, all while protecting against hardware failures.

To protect the metadata concerning the files organized and made available by a file system, the file system may include a metadata dump facility that contains a mirror of the file system metadata. The metadata dump may be referred to as a metadump. The file system may seek to keep the metadump updated in real time as the metadata changes in the file system. The metadump may be intended to facilitate, for example, accelerated disaster recovery. In the event of a disaster, the metadump can be used to restore metadata in a wholesale manner for the file system it mirrors. Restoring the metadata may include rebuilding the structure(s) in which the metadata was stored and then populating those structure(s).

Keeping the metadump up-to-date may be a significant challenge due to the realities of large file systems. For example, making a change to a file may require the file system to perform updates to several independently stored pieces of metadata. But the underlying storage may not support making the several updates as an atomic operation. This set of updates may take the file system from one consistent state to another. Undesirable conditions may arise if a series of update operations are only partially recorded. Thus, a file system may be required to treat a series of operations as a transaction. Example transactions may include allocating space for a file, creating a file, updating a file, deleting a file, or other operations. With multiple hosts and multiple users, there may be a significant number of transactions.

As a file system became large, it may have been difficult, if even possible at all in a relevant time frame, to scan through the file system to find files to create and then maintain a metadump. Additionally, the metadump may have been stored as a file whose format mirrored the primary metadata format. This may have made it difficult, if even possible at all in a relevant time frame, to scan through all the files represented in the metadump file during a restore operation. Since the metadump is supposed to be an accurate, up-to-date in real time mirror of the file system metadata, creating a metadump may have required taking the file system off-line and making the file system unavailable while the file system was scanned and the metadump created so that no changes would be made and missed during creation. Similarly, using a metadump to restore a file system may have required keeping the file system off line and unavailable while the restore occurred. Having a file system off-line for any time, and particularly for an extended time (e.g., hours, days) is inconvenient at best, and generally unacceptable.

The challenges associated with keeping a metadump up-to-date in real-time also include the difference in latency between memory and non-memory (e.g., disk, tape) storage. This latency can produce conditions where changes made in one area (e.g., memory) are out of sync with changes made in another area (e.g., disk). Additionally, this latency motivates a file system to store in memory changes that are to be made to data on disk and then to make the actual changes on disk at a later time. For example, a series of reads and writes to a file may be made virtually in memory and then only made physically on disk at a later time. While this delayed update approach may solve one problem associated with excessive random input/output (i/o), it may produce another problem associated with memory and disk being out of sync. The file system metadata may indicate that a change has been made, and that change may have been performed in memory, but the actual underlying data on disk may not have been changed.

For all these reasons, improvements to creating, maintaining, and using file system metadumps are sought.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example apparatus and methods concern preserving and restoring the structure and contents of metadata associated with a file system. Example apparatus and methods can preserve and restore metadata for the file system while the file system remains active. As used herein, "file system" may also refer to a shared disk file system. A dual process approach that includes both multi-threaded, systematic, system-wide scanning (e.g., crawling) and on-demand (e.g., transactional) precise action may operate in parallel to create, maintain, and restore file system metadata. Other use cases for the dual process approach include migrating file system metadata from one format to another, de-fragmenting inode space, de-fragmenting metadata space, and other actions.

Figure 1:
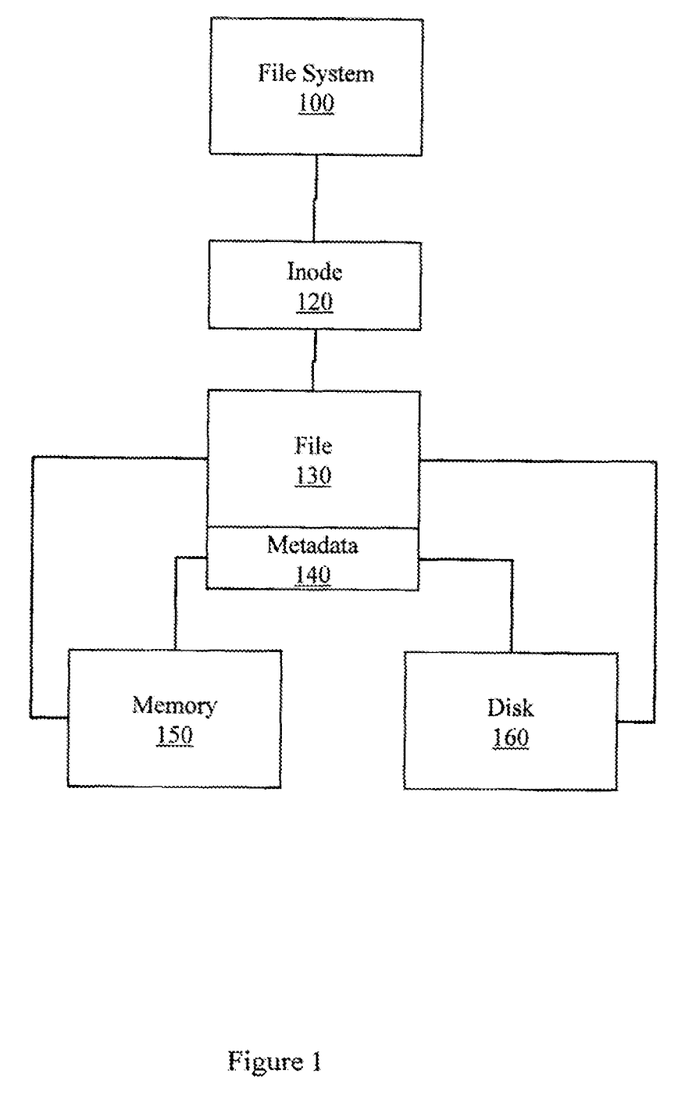
FIG. 1 illustrates a file system.

Figure one illustrates a file system 100. While a user may refer to a file 130 using a file name, the file system 100 may refer to the file 130 using an inode 120. When a change is made to the file 130, there may also be a change to the metadata 140 of the file. The metadata 140 may include, for example, the name of a file, the size of a file, the owner of a file, the most recent access time of a file, and other information. In some occurrences, the updated file 130 may be stored in memory 150. Similarly, in some occurrences, the updated metadata 140 may be stored in memory 150. Ultimately, the updated file 130 and the updated metadata 140 may be stored on disk 160. While there are changes that have been made only in memory 150, a journal may be used to protect those changes. In one embodiment, some of the metadata 140 for a file 130 may be stored in the inode 120 associated with the file. The inode 120 may also store association metadata (e.g., parent, child) for a file. The association metadata may describe, for example, a parent (e.g., directory) for a file or a descendant (e.g., sub-directory, file) for a directory. The inodes and metadata may be stored in data structures about the files. Thus, file system 100 may have both files and data structures about those files. Example apparatus and methods capture and restore both the structure of the metadata and the contents of the metadata.

Figure 2:
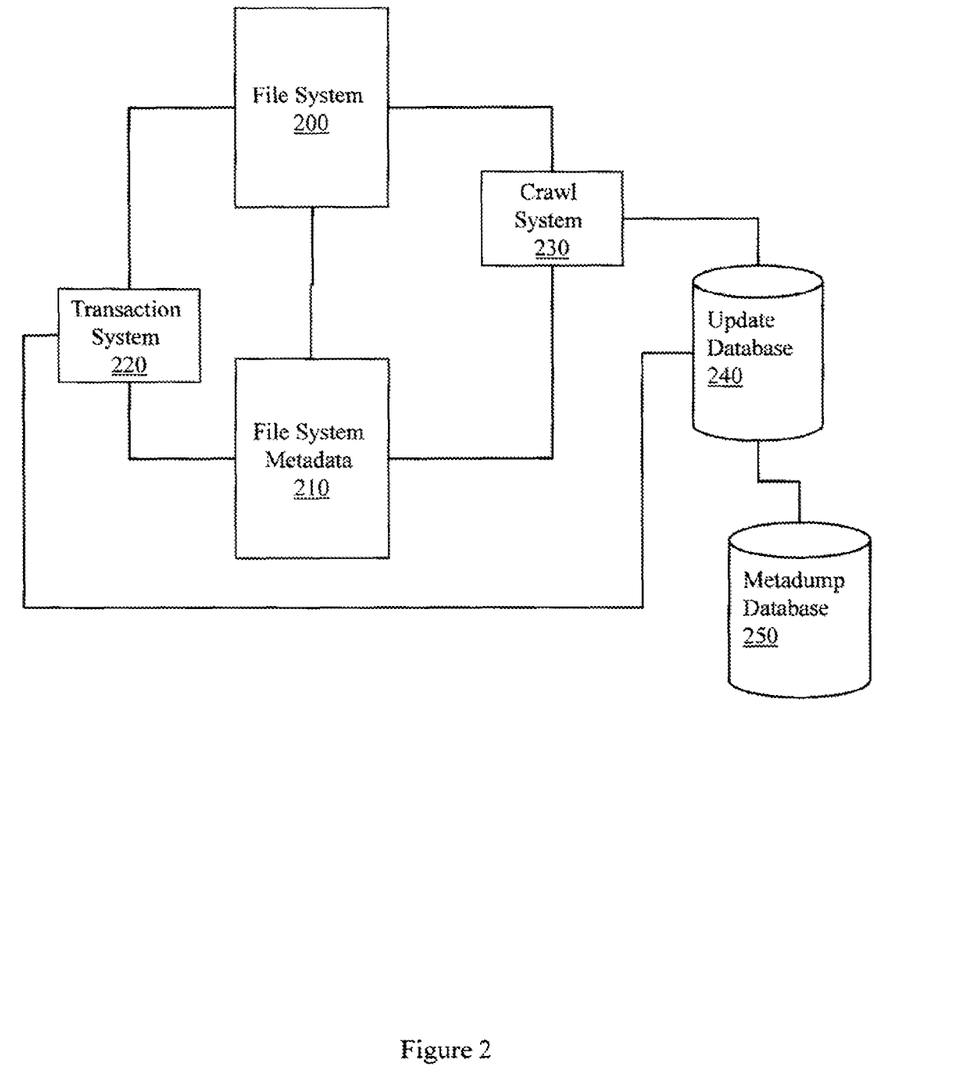
FIG. 2 illustrates an example file system metadata capture system.

FIG. 2 illustrates an example file system metadata capture system. A file system 200 has file system metadata 210. A mirror of the file system metadata 210 is stored in metadump database 250. Rather than write an exact mirror of file system metadata 210 to metadump database 250, which would require stopping file system 200 while the metadata 210 was scanned, example systems take a two process and two stage approach. A crawl system 230 is configured to systematically move through the file system 200 or file system metadata 210 to locate and analyze files or inodes. The crawl system 230 may use different approaches including, for example, a depth-first tree walk, a breadth-first search, a combination of searches, or other approaches. The crawl system 230 may identify inodes that are parent inodes and spawn additional threads to search the descendants of the parent. The additional threads may operate in parallel. The crawl system 230 may populate an update database 240 with information discovered in the file system 200 or metadata 210. The crawl system can work while the file system 200 is still operating because changes made to an inode after the crawl system 230 has reported on the inode may be caught by transaction system 220.

Transaction system 220 posts changes to the file system 200 or metadata 210 to the update database 240. The transaction system 220 operates at least partially in parallel with the crawl system 230 and operates while the file system 200 is active. Thus, update database 240 receives both crawler information and transactional information, which facilitates creating and maintaining an up-to-date mirror of the file system metadata 210 in metadump database 250. The transaction system 220 may batch up a number (e.g., hundred, thousand, hundred thousand) of transactions before posting the transactions to the update database 240. The update database 240 may therefore be able to collapse, manipulate, or otherwise optimize transactions before posting them to metadump database 250. For example, the update database 240 may perform peephole optimization on the batch of transactions or other transactions collected in update database 240. Using the two stage process where information first goes to the update database 240 and then is selectively posted to the metadump database 250 faciliates decoupling file system journaling from the application of metadump updates, which can remove a file system bottleneck found in conventional one-stage, tightly-coupled systems.

Figure 3:
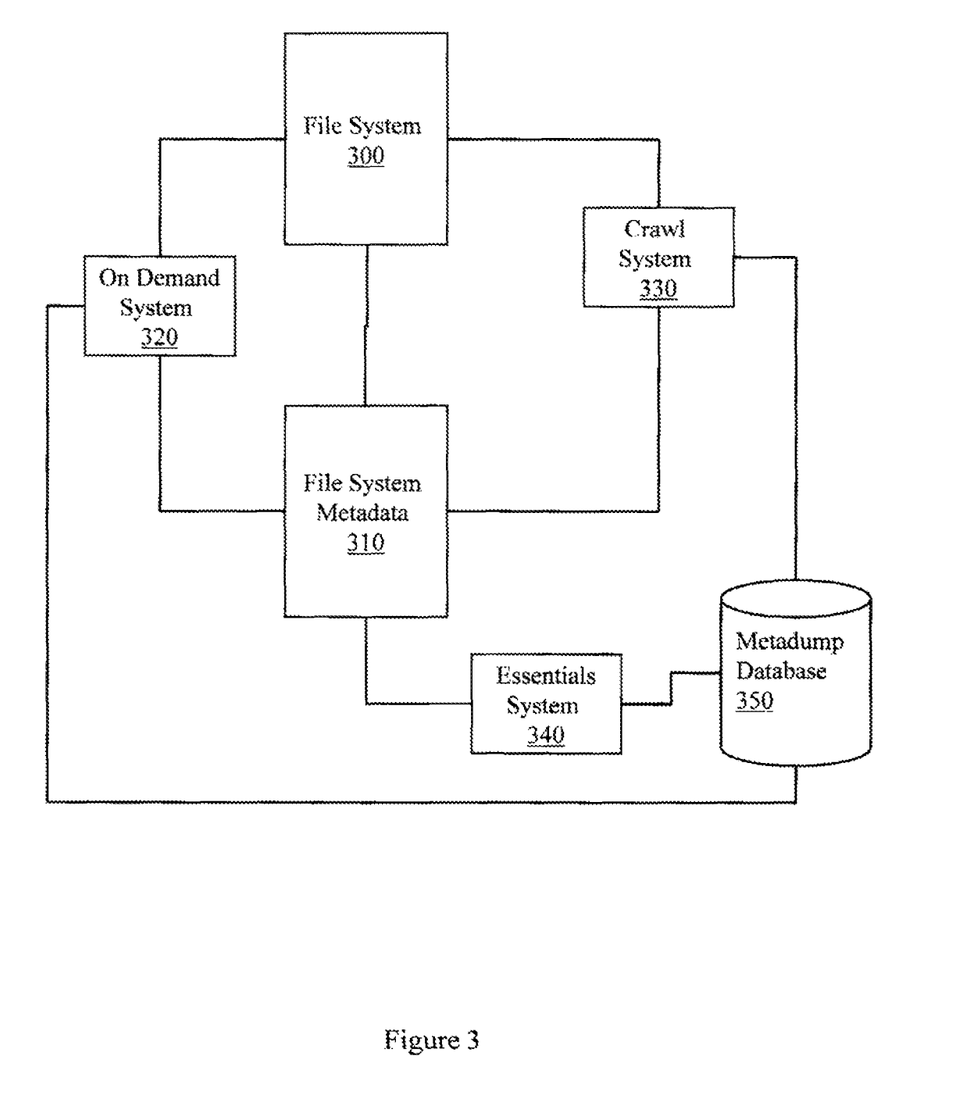
FIG. 3 illustrates an example file system metadata restore system.

FIG. 3 illustrates an example file system metadata restore system. This system may operate with the file system mostly online, with just a brief initial offline portion at the beginning of a restore. Metadump database 350 stores metadata sufficient to restore the file system metadata 310. Metadump database 350 may have been built using, for example, a metadump creation system like that illustrated in figure two. The file system metadata 310 will be restored from the metadump database 350 using an essentials system 340, a crawl system 330, and an on-demand system 320.

File system 300 and file system metadata 310 are supported by hardware. When the supporting hardware is ready, essentials system 340 may create a new empty file system. Creating a new, empty file system may include, for example, initializing data structures for storing the content of metadata 310. The essentials system 340 may put a root inode in the new, empty file system. Essentials system 340 may also acquire quota information from metaddump database 350 and configure the empty file system as a function of the quota information. Essentials system 340 may also acquire allocation information from metadump databse 350. The allocation information may be, for example, extents information that describes the physical locations (e.g., disks, blocks, sectors, drives, RAID blocks) where files in file system 300 are allocated. An extent may be, for example, a number of contiguous data blocks on a data storage device. The allocation information may be, for example, btree payload information stored in the metadump database 350. Once the essentials system 340 has prepared the new, empty file system for which the metadata is to be restored, the crawl system 330 and on-demand system 320 may begin operation.

The crawl system 330 is configured to systematically restore all the file system metadata from the metadump database 350. The crawl system 330 may do a depth-first tree-order walk of the file system 300 to find sub-trees (e.g., parent/child relationships) and may spawn threads that operate concurrently to restore the various sub-trees. The on-demand system 320 is available to handle requests for a specific file in the file system 300 for which metadata has not yet been restored by the crawl system 330. When the on-demand system 320 detects a request for a file whose metadata has not yet been restored, the on-demand system 320 may restore that metadata out-of-order before the crawl system 330 would eventually get around to restoring the metadata. Thus, the systematic approach can proceed in its own way at its own pace with the transactional approach there to handle specific requests.

Figure 4:
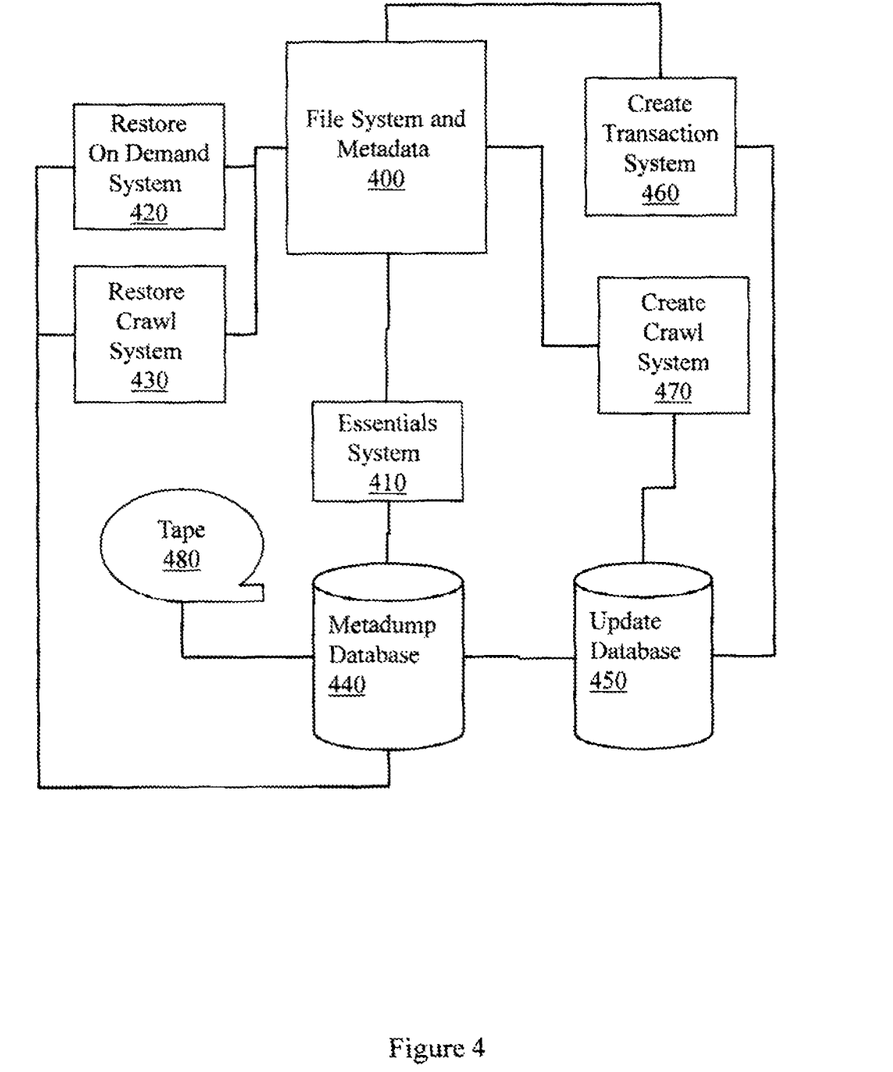
FIG. 4 illustrates an example file system metadata capture and restore system.

FIG. 4 illustrates an example file system metadata capture and restore system that includes elements from the metadata capture system illustrated in figure two and the metadata restore system illustrated in figure three. File system and metadata 400 are mirrored in a metadump database 440 that is created and maintained by a create crawl system 470 and create transaction system 460 that populate update database 450. Update database 450 then selectively updates metadump database 440. Update database 450 may perform optimizations, filtering, or other actions on data presented to update database 450 before posting to metadump database 440. Because update database 450 can buffer or journal incoming data, updates to metadump database 440 may be suspended to allow, for example, writing data from metadump database 440 to tape 480 or to other locations. This facilitates, for example, backing up or distributing the metadata mirror in metadump database 440.

Metadump database 440 can also be used to restore metadata using essentials system 410, restore crawl system 430, and restore on demand system 420. Since update database 450 can buffer or journal incoming information, both the create/maintain features and restore features may operate at the same time. Having both operate at the same time may be useful in, for example, inode conversion, inode upgrade, file system migration, file system updates, or other actions. Conventionally, it may have been difficult, if even possible at all, to change mode numbers. Example apparatus, methods, and systems facilitate changing inode numbers at least in part due to the two database approach for storing metadata. Conventionally, changing inode numbers may have required shutting down the file system and experiencing processing on the order of $O(N^2)$, where N was the number of inodes. This was practically impossible. Since modes for an active file system may be mirrored in the metadump database 440, and since updates to the file system may be buffered in the update database 450, example apparatus, methods, and systems may not need to shut down the file system to change inodes and may change the inodes while only experiencing processing on the order of $O(logN)$. Being able to change inode numbers facilitates, for example, performing inode defragmentation by selectively allocating new inodes in patterns. For example, modes that are located close together (e.g., sequentially) may be allocated for files in a directory. Allocating new inodes also facilitates, for example, migrating from one version of inodes to another version of inodes. Since the create/maintain and restore can operate at the same time, and since the update database 450 can buffer changes, inode maintenance (e.g., defragmentation, conversion, migration) may occur while the file system is still in operation.

Figure 5:
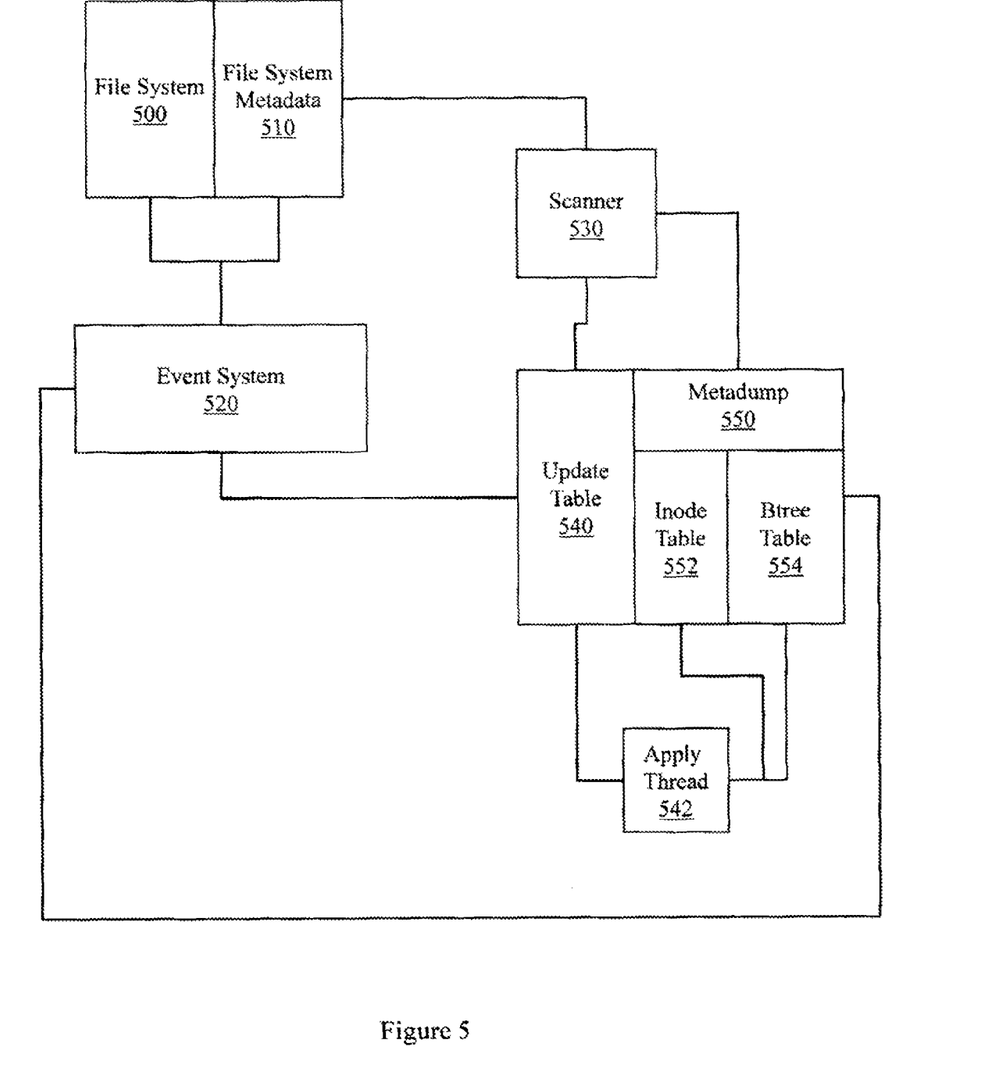
FIG. 5 illustrates an example file system metadata capture and restore system.

FIG. 5 illustrates an example file system metadata capture and restore system. In this embodiment, file system 500 and file system metadata 510 interact with a single scanner 530 and a single event system 520. The scanner 530 may be multi-threaded and may provide both inbound (e.g., create/maintain) services and outbound (e.g., restore) services. The event system 520 may also be multi-threaded and may also provide both inbound and outbound services.

The metadata 510 is stored in a metadump 550 that may include multiple database tables. For example, the metadump 550 may include an inode table 552 that stores information about the structure of file system 500 including its inodes and their relationships. In one embodiment the file system 500 or the file system metadata 510 may be organized as a set of trees (e.g., btrees). Therefore, the metadump 550 may also include a btree table 554 that stores key/value pairs from the set of trees. In one embodiment, the metadump 550 may be a structured query language (SQL) database and the inode table 552 and the btree table 554 may be tables in the SQL database.

The scanner 530 and event system 520 may populate an update table 540 during inbound processing (e.g., create/maintain) and may retrieve information from the metadump 550 during output processing (e.g., restore). Data may be selectively moved from the update table 540 to the inode table 552 or the btree table 554 by an apply thread 542. The apply thread 542 may perform optimizations (e.g., peephole optimization). "Peephole optimization" refers to analyzing a set of transactions to identify transactions that can be removed due, for example, to later superceding transactions. For example, a file may be "touched" a hundred times in a row without changing any of the contents of the file. However, each touch may change the access time for the file and create a separate file system transaction for each touch. Peephole optimization may recognize the hundred touches and realize that only the last touch is relevant and therefore remove the transactions associated with the previous ninety-nine touches. Other such optimizations may also be applied. The apply thread 542 may also be selectively paused to allow the metadump 550 to quiesce before, for example, a backup operation.

In one embodiment, writes from the scanner 530 or event system 520 may be asynchronous writes that need to be completed before the data associated with the write is removed from the scanner or event system 520. Similarly, in one embodiment, writes from the apply thread 542 may be asynchronous writes that need to be completed before the data associated with the write is removed. In one embodiment, when the update table 540, inode table 552, and btree table 554 are SQL database tables, writes to the tables may use a write-ahead log approach.

The inode table 552 and the btree table 554 may store information sufficient for restoring file system metadata 510. While inode table 552 and btree table 554 provide a mirror of file system metadata 510, the tables may not be constrained to share the exact format of the structures or hierarchy in file system metadata 510. For example, hierarchical structures or trees in file system metadata 510 may be flattened into table structures that preserve the metadata information without being constrained by the metadata organization, When tables are used, actions like allocating new inode numbers, changing inode numbers, converting inodes to new formats, or making other changes to inodes or metadata may be done more efficiently in the tables using database tools or techniques.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 6:
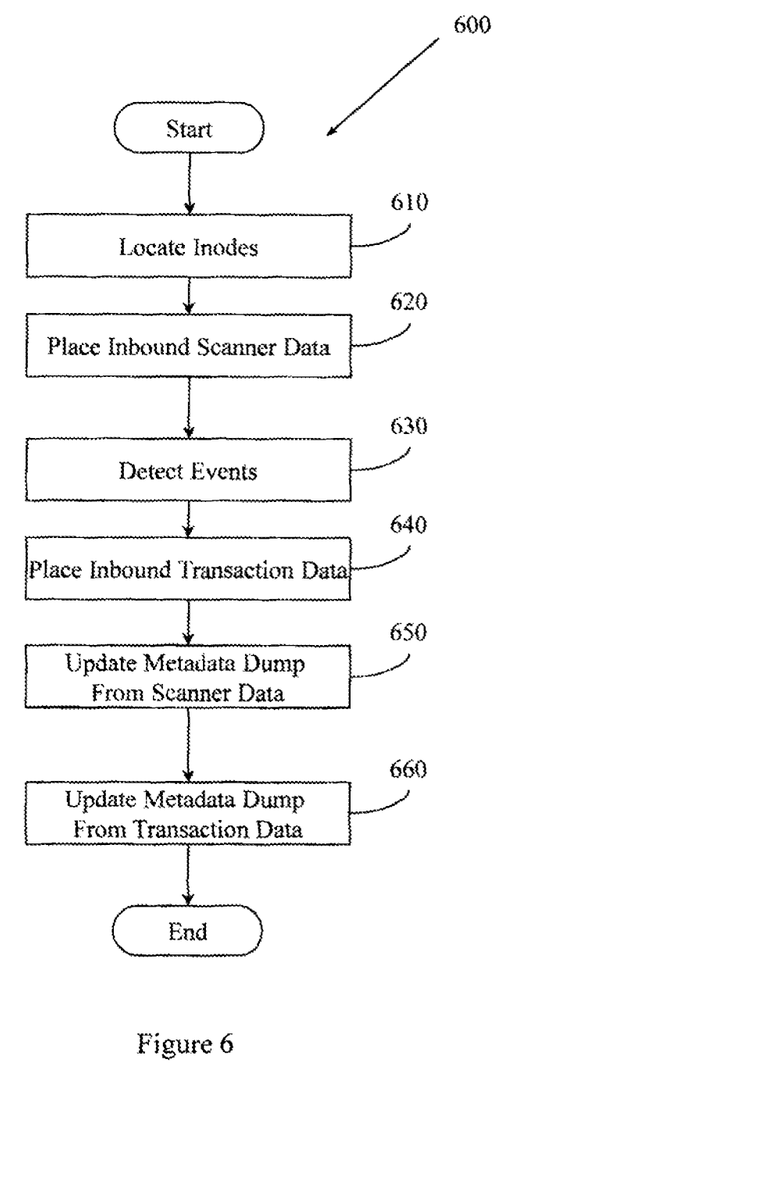
FIG. 6 illustrates an example method associated with file system metadata capture.

FIG. 6 illustrates a method 600 associated with file system metadata capture. Method 600 includes, at 610, systematically locating inodes in an active file system. An active file system is a file system that is available for file system operations. In one embodiment, systematically locating inodes comprises locating every inode in the active file system. Locating inodes may include performing a depth-first tree walk, a breadth-first tree walk, a combination depth-first breadth-first tree walk, or other systematic approaches. For example, a breadth-first walk may be performed to identify directories and sub-directories in a file system and then depth-first walks may be performed in parallel or concurrently for the discovered sub-hierarchies. In one embodiment, locating inodes at 610 includes launching an inbound scanner thread upon determining that a located inode is a parent inode in the active file system. The newly launched inbound scanner thread may be configured to locate inodes that descend from the parent inode and to provide inbound scanner data concerning the descendant inodes to the metadata update data store. Additional threads may be spawned for other discovered sub-hierarchies. In one embodiment, the inbound scanner threads operate at least partially in parallel with locating inodes at 610 and detecting events at 630.

Method 600 may also include, at 620, placing inbound scanner data associated with a located inode in a metadata update data store. In one embodiment, the inbound scanner data may include an inode number and an inode state. The inode state may include, for example, metadata associated with the inode (e.g., access time, owner, permissions). Placing the inbound scanner data may include, for example, performing an asynchronous write to a database, table, or other data store, writing a record, updating a memory, updating a register, or other actions.

Method 600 may also include, at 630, detecting events that change inodes in the active file system. The events may be, for example, a file creation, a file deletion, a read from a file, a write to a file, changing the permissions for a file, or other action. The events may be stored, for example, in a transaction log. Thus, in one example, detecting events may include monitoring a file system transaction log or stream. In another example, detecting an event may include receiving a computer interrupt, receiving a remote procedure call, receiving a message though a socket or pipe, or other action. In one embodiment, before placing the inbound transaction data in the metadata update data store, the method 600 may batch together information concerning a pre-determined number (e.g., one hundred, one thousand, one hundred thousand) of events that change inodes in the active file system. The events may be batched into an inbound transaction data batch before providing the inbound transaction data batch to the metadata update data store at 630.

Method 600 may also include, at 640, placing in the metadata update data store inbound transaction data concerning a changed inode or the event the changed the changed inode. In one embodiment, the inbound transaction data may include an inode number, an inode state, and information about the event that changed the changed inode. The information about the event may be retrieved, for example, from a transaction log or stream. Placing the inbound transaction data may include, for example, performing an asynchronous write to a database, table, or other data store. Placing the inbound transaction data may include, for example, updating a memory, updating a register, writing a record, making a procedure call, making an SQL call, or other action.

In one embodiment, the metadata update data store may be one or more structured query language (SQL) database tables and the metadata dump data store may be one or more SQL database tables. Therefore, placing inbound scanner data at 620 and placing inbound transaction data at 640 may involve performing an SQL write operation. The write may be an asynchronous write that has to complete before the data associated with the write is discarded. The write may be performed using a write ahead log approach.

Method 600 may also include, at 650, selectively updating a metadata dump data store from the metadata update data store as a function of the inbound scanner data. Method 600 may also include, at 660, selectively updating the metadata dump data store from the metadata update data store as a function of the inbound transaction data. Selectively updating the metadata dump data store may include, for example, performing an SQL operation (e.g., update, select). In one embodiment, method 600 may include performing peephole optimization on data in the metadata update data store before updating the metadata dump data store from the metadata update data store at 650 or 660.

In one embodiment, locating inodes at 610, placing inbound scanner data at 620, detecting events at 630, placing inbound transaction data at 640, and selectively updating the metadata dump data store at 650 and 660 operate at least partially in parallel and continuously. The actions from 610 to 660 populate the metadata dump data store with metadata sufficient to restore the metadata of the active file system. Method 600 may operate for a long time (e.g., days, months, years). During that time, it may be desirable to use the metadump data store for other purposes. For example, a user may want to make a backup of the metadump data store. Therefore, method 600 may include selectively pausing updates to the metadata dump data store from the metadata update data store to facilitate copying the metadata dump data store to a target location or to facilitate other actions. The file system may continue to operate while updates to the metadump data store are paused because the metadata update data store can buffer incoming data.

In one example, the active file system may store inodes and file system metadata associated with the active file system in one or more btrees. Therefore, in one example, method 600 may include establishing the metadata dump data store with an inode table and a btree table. The inode table stores inode numbers and information from which the structure of the one or more btrees can be reconstructed. Similarly, the btree table stores key/value pairs from which the contents of the one or more btrees can be reconstructed.

Figure 7:
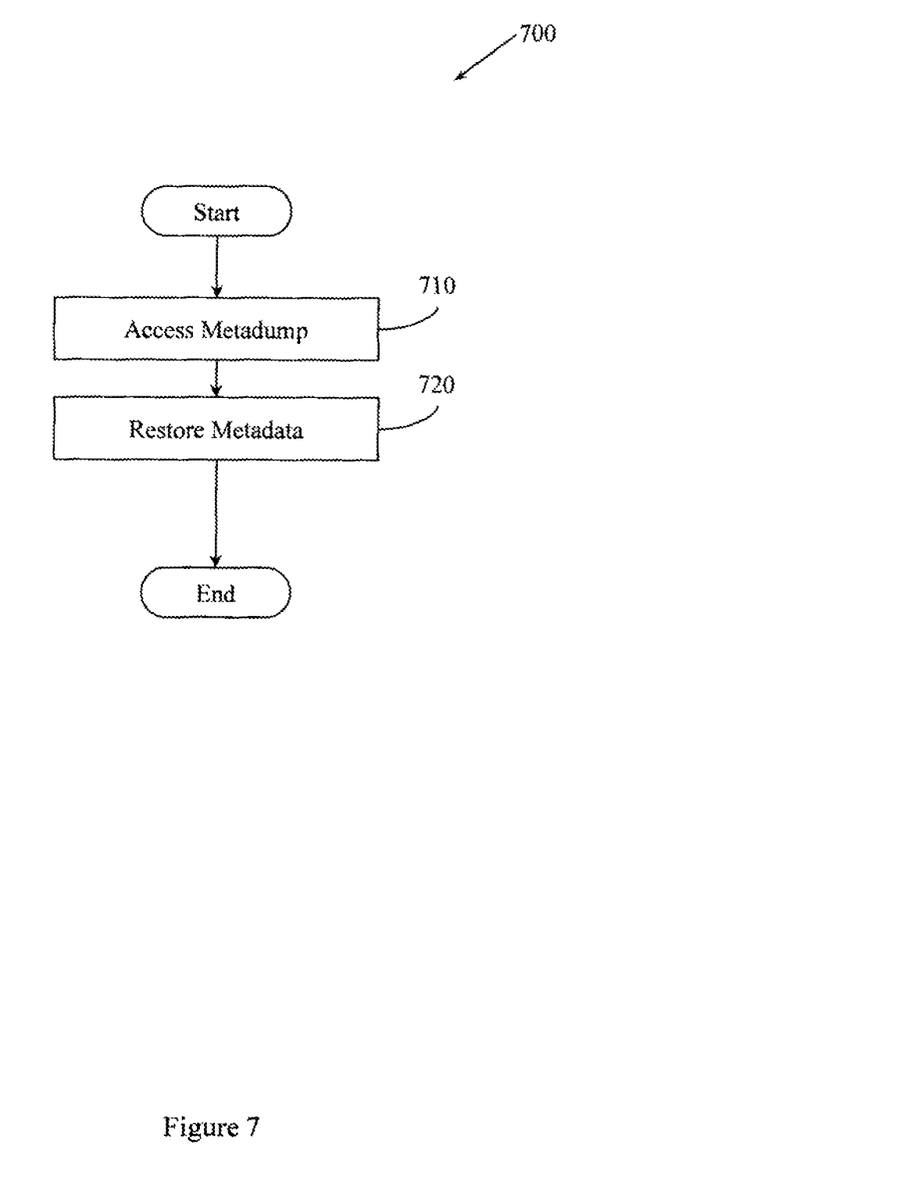
FIG. 7 illustrates an example method associated with file system metadata restore.

FIG. 7 illustrates a method 700 associated with file system metadata restore. Method 700 includes, at 710, accessing a metadata dump data store. Accessing the metadata dump data store may include opening a socket, opening a file, opening a table, following a link, establishing a remote procedure call pipe, or other action that makes the contents of the metadata dump data store available. The metadata dump data store stores metadata that can be used to restore metadata for a file system. In one embodiment, the file system may organize files using a set of btrees. The metadata dump data store may therefore include an inode table and a btree table. The inode table stores inode numbers and information from which the set of btrees can be populated. The btree table stores key/value pairs from which the contents of the set of btrees can be populated. While an inode table and a btree table are described, other tables, collections of tables, or other data structures may be present in the metadata dump data store.

Method 700 also includes, at 720, restoring the metadata for the file system from the metadata dump data store using an outbound scanner process and an on-demand transaction process. In one embodiment, the outbound scanner process systematically populates the set of btrees based on inode data from the inode table and btree data from the btree table. Additionally, the on-demand transaction process selectively populates a portion of the set of btrees for which a file system operation is requested based on inode data from the inode table and btree data from the btree table. More generally, the outbound scanner process restores metadata according to a plan while the on-demand transaction process restores metadata on an as-needed basis.

In one embodiment, restoring the metadata at 720 includes establishing a new set of file system metadata and making the new set of file system metadata unavailable for file system operations. Establishing the new set of file system metadata may include, for example, allocating memory for a set of data structures (e.g., trees, btrees) that will receive data from the metadata dump data store. Restoring the metadata at 720 may also include establishing, in the new set of file system metadata, a root inode for the file system. The root inode may be the ancestor of all inodes in the file system. The root inode may appear at the top of a data structure (e.g., tree).

Restoring the metadata at 720 may also include acquiring allocation information for the file system. The allocation information may be acquired, for example, from the metadata dump data store. Since the allocation information describes space that was previously allocated for the file system being restored, the method 700 may also include preventing the file system from re-allocating space identified by the allocation information. The allocation information may include blocks allocated for the file system, extents of blocks allocated for the file system, or other data.

Once the root inode has been allocated and the allocation information has been retrieved, the new file system may be made available for file system operations even though no files have been restored yet. As the outbound scanner process is working its way through the metadata to be restored, a request to use a file whose metadata has not yet been restored may be generated by the file system. This request may be handled by the on-demand transaction process.

Restoring the metadata at 720 may include identifying a parent/child relationship in the file system. Once a sub-hierarchy (e.g., sub-directory system) has been identified through the parent/child relationship, restoring the metadata at 720 may include launching a separate instance of an outbound scanner process to populate inodes involved in the parent/child relationship. The separate instance of the outbound scanner process may operate at least partially in parallel with the outbound scanner process.

Before the metadata is restored at 720, preliminary actions may be undertaken. For example, method 700 may include performing maintenance on the inodes in the inode table before restoring the metadata. Performing maintenance on the inodes may include, for example, allocating new inode numbers before restoring the metadata. The new inode numbers may be allocated consecutively to facilitate defragmenting inode space. While consecutive numbers are described, other inode allocation schemes may be employed to facilitate producing optimizations for the restored file system. For example, inodes may be allocated so that inodes and metadata associated with files that are known to exhibit temporal access locality may be located in a manner that increases more efficient input/output (e.g., sequential i/o) while reducing less efficient i/o (e.g., random i/o). Performing maintenance may also include, for example, changing from one inode format to another inode format, splitting the inodes into two or more separate file systems, merging inodes from two or more file systems into a single file system, or other actions.

While method 600 describes creating and maintaining a mirror of metadata, and while method 700 describes restoring metadata, in one embodiment, a single method may perform both method 600 and method 700, with the various portions of the combined method operating at least partially in parallel.

In one example, a method may be implemented as computer executable instructions. Thus, in one example, a computer-readable medium may store computer executable instructions that if executed by a machine (e.g., processor) cause the machine to perform methods 600 or 700. While executable instructions associated with methods 600 and 700 are described as being stored on a computer-readable medium, it is to be appreciated that executable instructions associated with other example methods described herein may also be stored on a computer-readable medium.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
SSD: solid state drive
SAN: storage area network.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

Figure 8:
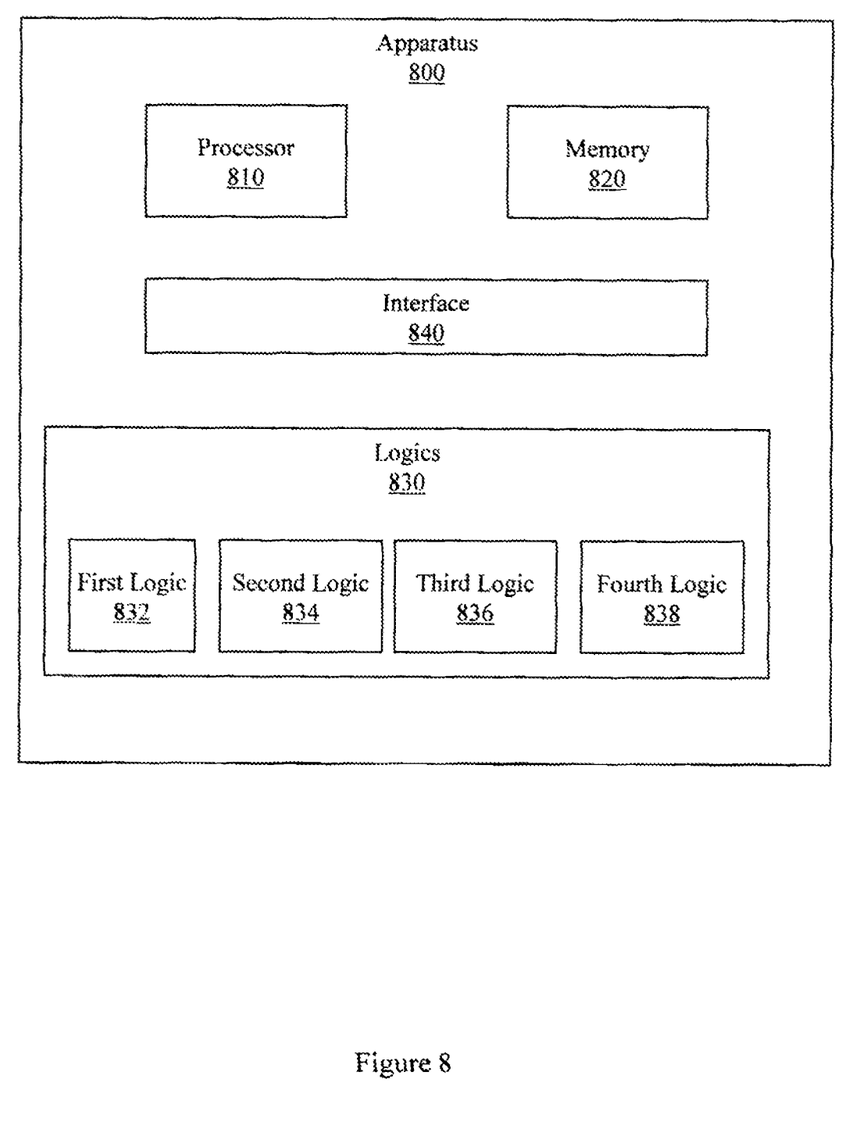
FIG. 8 illustrates an example apparatus with file system metadata capture.

FIG. 8 illustrates an apparatus 800 that includes a processor 810, a memory 820, and a set 830 of logics that is connected to the processor 810 and memory 820 by an interface 840. The memory 820 may be configured to store file system metadata state information.

The set 830 of logics may include a first logic 832 that is configured to instantiate a functional mirror of file system metadata for an active file system as a plurality of database tables. The plurality of tables may include a first table to act as a pending table and a second table to act as a posted table. In one embodiment, the tables may be SQL database tables. In one embodiment, the apparatus 800 may selectively update the posted table from the pending table. When the tables are SQL database tables, the posted table may be updated from the pending table using a write ahead log approach. Data in the pending table may be manipulated (e.g., peephole optimized, filtered, revised) before being posted to the posted table.

The apparatus 800 may also include a second logic 834 that is configured to populate the functional mirror using a systematic, system-wide, multi-threaded crawler approach. The multi-threaded crawler may launch a thread for portions of the file system hierarchy that can be visited in parallel. For example, a directory may have two independent sub-directories. The multi-threaded crawler may identify the directory as a parent node, identify the two sub-directories as sub-hierarchies, and launch separate threads to crawl the two sub-hierarchies independently. In one embodiment, the two threads may operate in parallel. In one example, the second logic 834 provides metadata structure information and metadata content information to the pending table. The structure information may describe the data structure(s) (e.g., trees, btrees, hierarchies) in which the metadata was stored. The content information may be the payloads of the data structures (e.g., key/value pairs).

The apparatus 800 may also include a third logic 836 that is configured to maintain the functional mirror using an event-driven approach. Maintaining the functional mirror may include identifying events that change the inodes that have been visited by the multi-threaded crawler. Rather than having to halt the file system to prevent the data that was provided by the multi-threaded crawler from being obsoleted by these events, the events can be detected and information about the events provided to the pending table. The information in the pending table can be reconciled with other information in the pending table (e.g., information from multi-threaded crawler) or can be used to bring the posted table up to date.

The third logic 836 may detect file system transactions that change metadata in the active file system. The transactions may be, for example, file opens, file closes, file writes, file reads, changing file ownership, changing file permissions, and other actions. In one embodiment, rather than present each transaction as soon as it occurs, the third logic 836 may produce a collection (e.g., batch) of transactions and then present the collection of transactions to the pending table in one large sequential write. Providing the collection of transactions as one item may facilitate filtering or otherwise optimizing the transactions to reduce interactions with the posted table.

The apparatus 800 may also include a fourth logic 838 that is configured to restore the file system metadata from the functional mirror using both a systematic, system-wide, multi-threaded crawler approach and an event-driven approach. The systematic, system-wide multi-threaded crawler may restore the metadata according to a plan (e.g., depth first tree walk) while the event-driven approach may restore certain files on an as-needed approach.

Since revisions and upgrades happen more frequently than failures, "restoring" the metadata may be associated with an upgrade rather than a failure. Therefore, fourth logic 838 may be configured to restore the metadata for a file system as the result of an upgrade, conversion, merging, split, or other non-failure operation.

In one embodiment, the second logic 834, third logic 836, and fourth logic 838 operate at least partially in parallel. For example, the third logic 836 can be handling file system events that change inode data while the second logic 834 is systematically working its way through the file system. Additionally, the fourth logic 838 can be restoring metadata while the third logic 836 is handling file system events that change inode data in the file system being restored.

Figure 9:
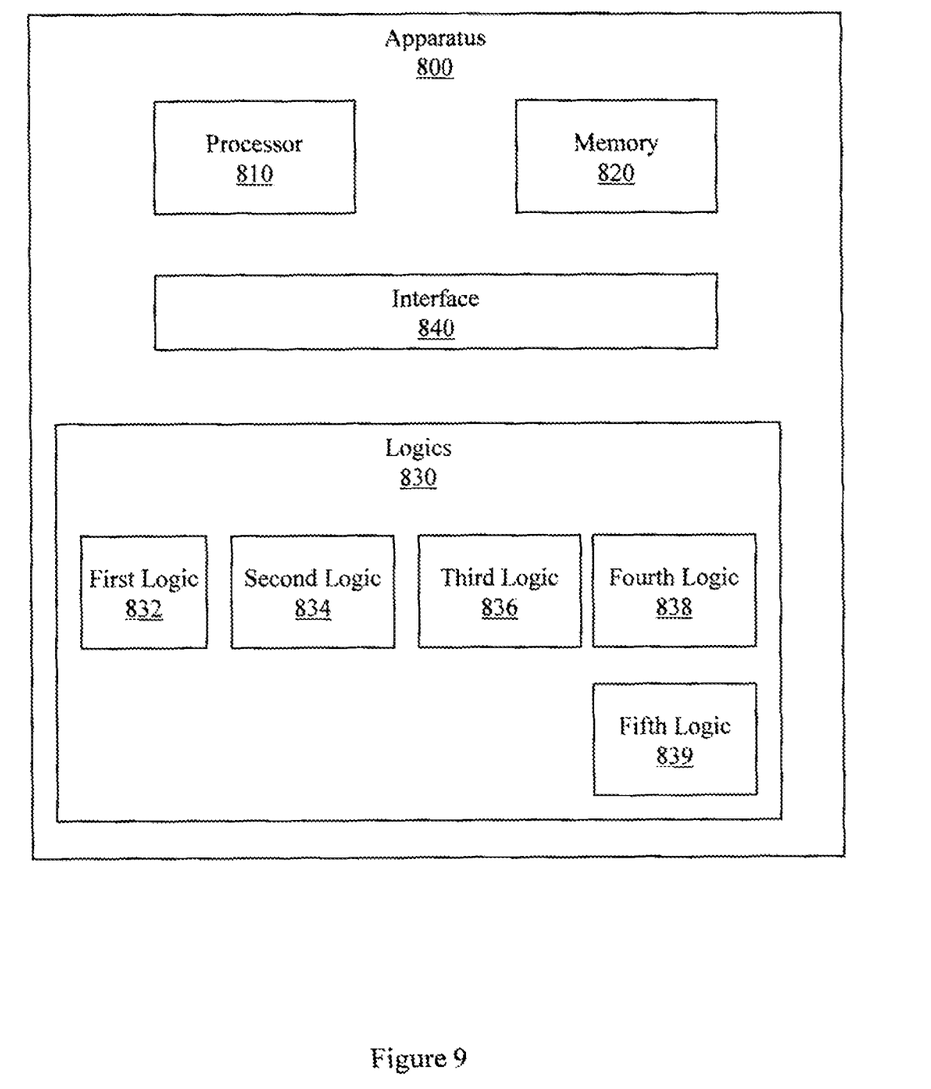
FIG. 9 illustrates an example apparatus associated with file system metadata capture and restore.

FIG. 9 illustrates another embodiment of apparatus 800. This embodiment includes a fifth logic 839. The fifth logic 839 may be configured to perform inode maintenance, inode conversion, or inode defragmentation. In this embodiment, "restoring" metadata may be associated with updating metadata after the maintenance has been performed rather than following a failure. In one embodiment the fifth logic 839 may be able to allocate new inodes and new inode numbers for metadata that is being "restored". Since new inodes and new inode numbers can be allocated, fifth logic 839 may participate in inode defragmentation, inode conversion, file system splitting, file splitting merging, or other activities. Conventionally, any of these actions, if even possible at all, required the file system to be taken off line. Since maintenance of file system metadata can be handled on a transactional basis, which allows restoration and maintenance to occur simultaneously, both maintenance and restoration can occur without taking the file system offline.

Figure 10:
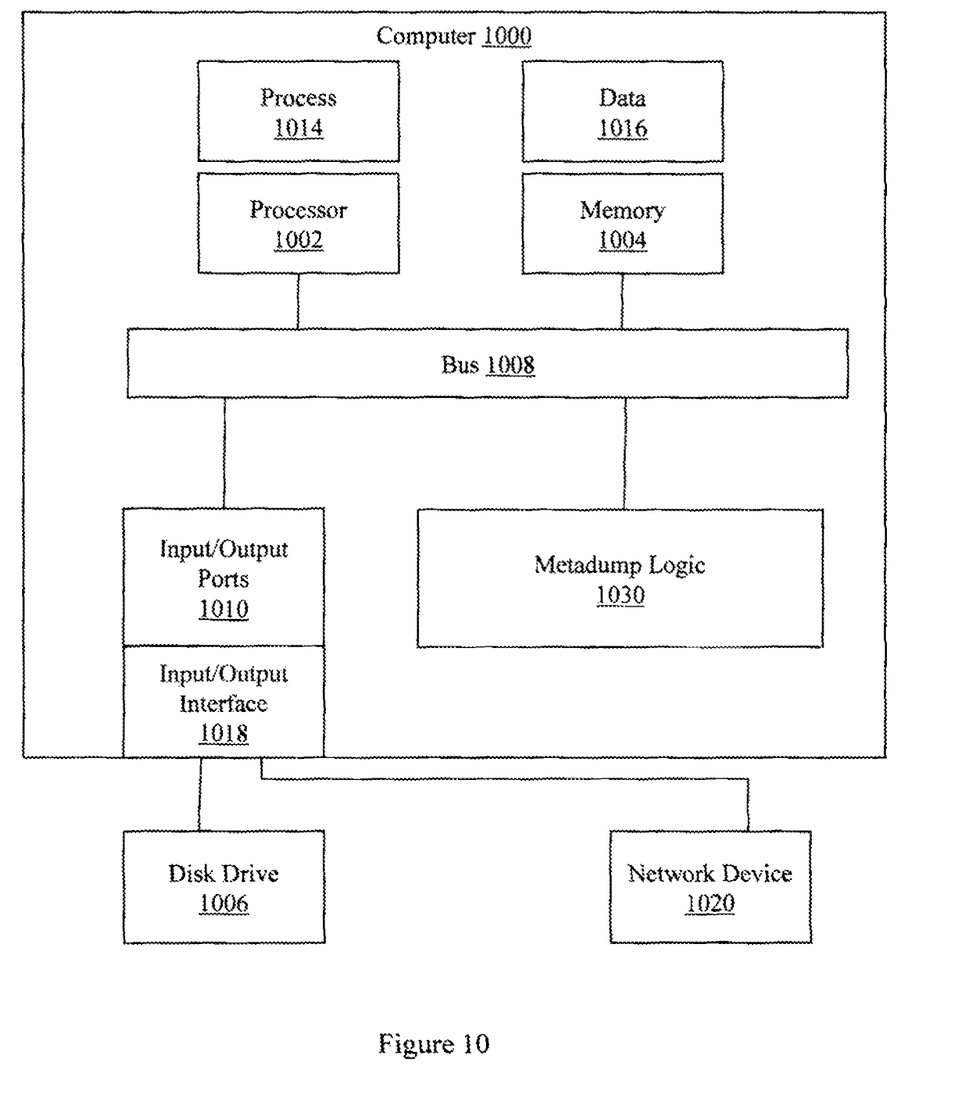
FIG. 10 illustrates an example apparatus associated with file system metadata capture and restore.

FIG. 10 illustrates an example computing device in which example systems and methods described herein, and equivalents, may operate. The example computing device may be a computer 1000 that includes a processor 1002, a memory 1004, and input/output ports 1010 operably connected by a bus 1008. In one example, the computer 1000 may include a metadump logic 1030 configured to capture and restore the structure and contents of file system metadata. In different examples, the logic 1030 may be implemented in hardware, software, firmware, and/or combinations thereof. While the logic 1030 is illustrated as a hardware component attached to the bus 1008, it is to be appreciated that in one example, the logic 1030 could be implemented in the processor 1002.

Thus, logic 1030 may provide means (e.g., hardware, software, firmware) for preserving the structure and contents of metadata for a file system using a comprehensive inbound file system metadata investigator. Logic 1030 may also provide means (e.g., hardware, software, firmware) for maintaining the structure and contents of metadata for the file system using a file system transaction detector. In one embodiment, the means for preserving and the means for maintaining use a two stage table-based approach to provide a journal-like function for updates to file system metadata. The means for preserving and means for maintaining may first update a pending write data store and then control the pending write data store to preserve and maintain the structure and contents of metadata by selectively updating a posted data store.

Logic 1030 may also provide means (e.g., hardware, software, firmware) for restoring the structure and contents of metadata for the file system using a comprehensive outbound file system metadata placer and an on-demand outbound file system metadata placer. In one embodiment, the means for preserving, the means for maintaining, and the means for restoring operate at least partly in parallel.

The means associated with logic 1030 may be implemented, for example, as an ASIC that implements the functionality of apparatus described herein. The means may also be implemented as computer executable instructions that implement the functionality of methods described herein and that are presented to computer 1000 as data 1016 that are temporarily stored in memory 1004 and then executed by processor 1002.

Generally describing an example configuration of the computer 1000, the processor 1002 may be a variety of various processors including dual microprocessor and other multiprocessor architectures. A memory 1004 may include volatile memory and/or non-volatile memory. Non-volatile memory may include, for example, ROM, PROM, and other memory. Volatile memory may include, for example, RAM, SRAM, DRAM, and other memory.

A disk 1006 may be operably connected to the computer 1000 via, for example, an input/output interface (e.g., card, device) 1018 and an input/output port 1010. The disk 1006 may be, for example, a magnetic disk drive, a solid state disk drive, a floppy disk drive, a tape drive, a Zip drive, a flash memory card, a memory stick, or other device. Furthermore, the disk 1006 may be a CD-ROM drive, a CD-R drive, a CD-RW drive, a DVD ROM drive, a Blu-Ray drive, an HD-DVD drive, or other device. The memory 1004 can store a process 1014 and/or a data 1016, for example. The disk 1006 and/or the memory 1004 can store an operating system that controls and allocates resources of the computer 1000.

The bus 1008 may be a single internal bus interconnect architecture and/or other bus or mesh architectures. While a single bus is illustrated, it is to be appreciated that the computer 1000 may communicate with various devices, logics, and peripherals using other busses (e.g., PCIE, 1394, USB, Ethernet). The bus 1008 can be types including, for example, a memory bus, a memory controller, a peripheral bus, an external bus, a crossbar switch, and/or a local bus.

The computer 1000 may interact with input/output devices via the i/o interfaces 1018 and the input/output ports 1010. Input/output devices may be, for example, a keyboard, a microphone, a pointing and selection device, cameras, video cards, displays, the disk 1006, the network devices 1020, and other devices. The input/output ports 1010 may include, for example, serial ports, parallel ports, and USB ports.

The computer 1000 can operate in a network environment and thus may be connected to the network devices 1020 via the i/o interfaces 1018, and/or the i/o ports 1010. Through the network devices 1020, the computer 1000 may interact with a network. Through the network, the computer 1000 may be logically connected to remote computers. Networks with which the computer 1000 may interact include, but are not limited to, a LAN, a WAN, and other networks.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing computer-executable instructions that when executed by a computer cause the computer to perform a method, the method comprising:
   systematically locating inodes in an active file system and placing inbound scanner data associated with a located inode in a metadata update data store, where the active file system stores inodes and file system metadata associated with the active file system in one or more btrees, where the inbound scanner data comprises an inode number and an inode state, where the inode state includes an access time, an owner, and a permission;
   detecting events that change inodes in the active file system;
   batching together information concerning at least one thousand events that change inodes in the active file system into an inbound transaction data batch;
   placing the inbound transaction data batch concerning a changed inode or the event that changed the changed inode in the metadata update data store, where an event includes a file creation event, a file deletion event, a read from a file event, a write to a file event, or a permission changing event;
   selectively updating a metadata dump data store from the metadata update data store as a function of the inbound scanner data; and
   selectively updating the metadata dump data store from the metadata update data store as a function of the inbound transaction data,
   where systematically locating inodes comprises locating inodes in the active file system according to a depth-first tree walk, a breadth-first tree walk, or a combination depth-first breadth-first tree walk,
   where selectively updating the metadata dump data store includes flattening a data structure within the metadata dump store into a table structure, and
   where locating inodes, detecting events, and selectively updating the metadata dump data store operate at least partially in parallel to populate the metadata dump data store using a systematic, system-wide, multi-threaded crawler approach with metadata sufficient to restore the metadata of the active file system.

2. The non-transitory computer-readable medium of claim 1, where systematically locating inodes comprises locating every inode in the active file system.

3. The non-transitory computer-readable medium of claim 1, the method comprising launching an inbound scanner thread upon determining that the located inode is a parent inode in the active file system, where the inbound scanner thread is configured to locate descendant inodes associated with descendants of the parent inode and to provide inbound scanner data concerning the descendant inodes to the metadata update data store, where the inbound scanner thread operates at least partially in parallel with locating inodes and detecting events.

4. The non-transitory computer-readable medium of claim 1, the inbound transaction data comprising an inode number, an inode state, and information about the event that changed the changed inode.

5. The non-transitory computer-readable medium of claim 1,
   the method comprising establishing the metadata dump data store with an inode table and a btree table, where the inode table stores inode numbers and information from which the structure of the one or more btrees can be reconstructed, and where the btree table stores key/value pairs from which the contents of the one or more btrees can be reconstructed.

6. The non-transitory computer-readable medium of claim 1, the method comprising selectively pausing updates to the metadata dump data store from the metadata update data store to facilitate copying the metadata dump data store to a target location.

7. The non-transitory computer-readable medium of claim 1, the method comprising performing peephole optimization on data in the metadata update data store before updating the metadata dump data store from the metadata update data store.

8. A non-transitory computer-readable medium storing computer-executable instructions that when executed by a computer cause the computer to perform a method, the method comprising:
   accessing a metadata dump data store that is storing metadata to be restored for a file system that organizes files using a set of btrees, where the metadata dump data store comprises an inode table and a btree table, where the inode table stores inode numbers and information from which the set of btrees can be populated, and where the btree table stores key/value pairs from which the contents of the set of btrees can be populated; and
   restoring the metadata for the file system from the metadata dump data store using an outbound scanner process and an on-demand transaction process,
   where restoring the metadata comprises:
      establishing a new set of file system metadata and making the new set of file system metadata unavailable for file system operations;
      establishing, in the new set of file system metadata, a root inode for the file system;
      acquiring, from the metadata dump data store, allocation information for the file system, and preventing the file system from re-allocating space identified by the allocation information, where the allocation information includes btree payload information; and
      making the file system available for file system operations,
   where the outbound scanner process systematically populates the set of btrees based on inode data from the inode table and btree data from the btree table, and
   where the on-demand transaction process selectively populates a portion of the set of btrees for which a file system operation is requested based on inode data from the inode table and btree data from the btree table.

9. The non-transitory computer-readable medium of claim 8, the method comprising identifying a parent/child relationship in the file system and launching a separate instance of the outbound scanner process to populate inodes involved in the parent/child relationship, where the separate instance of the outbound scanner process operates at least partially in parallel with the outbound scanner process.

10. The non-transitory computer-readable medium of claim 8, the method comprising performing maintenance on the inodes in the inode table before restoring the metadata.

11. The non-transitory computer-readable medium of claim 10, where performing maintenance on the inodes includes allocating new inode numbers, changing an inode format, splitting a set of inodes into two or more separate file systems, or merging inodes from two or more file systems into a single file system.

12. The non-transitory computer-readable medium of claim 8, the method comprising:
- systematically locating inodes in an active file system and placing inbound scanner data associated with a located inode in a metadata update data store;
- detecting events that change inodes in the active file system and placing inbound transaction data concerning a changed inode or the event that changed the changed inode in the metadata update data store, where an event includes a file creation event, a read from a file event, a write to a file event, or a permission changing event;
- selectively updating the metadata dump data store from the metadata update data store as a function of the inbound scanner data; and
- selectively updating the metadata dump data store from the metadata update data store as a function of the inbound transaction data,
- where selectively updating the metadata dump data store includes flattening a structure within the metadata dump store into a table structure, and
- where locating inodes, detecting events, and selectively updating the metadata dump data store operate at least partially in parallel to populate the metadata dump data store with metadata sufficient to restore the metadata of the active file system.

13. An apparatus, comprising:
- a processor;
- a memory configured to store file system metadata state information;
- a set of logics; and
- an interface that connects the processor, the memory, and the set of logics;
- the set of logics comprising:
    - a first logic configured to instantiate a functional mirror of file system metadata for an active file system as a plurality of database tables, the plurality including a first table to act as a pending table and a second table to act as a posted table;
    - a second logic configured to populate the functional mirror using a systematic, system-wide, multi-threaded inbound crawler approach;
    - a third logic configured to maintain the functional mirror using an event-driven inbound approach, where an event includes a file creation event, a read from a file event, a write to a file event, or a permission changing event and
    - a fourth logic configured to restore the file system metadata from the functional mirror using both a systematic, system-wide, multi-threaded outbound crawler approach and an event-driven outbound approach,
    - where the second logic, third logic, and fourth logic operate at least partially in parallel,
    - where the apparatus selectively updates the posted table from the pending table, and
    - where the first logic, the second logic, the third logic, and the fourth logic operate while the active file system remains active.

14. The apparatus of claim 13, where the second logic provides metadata structure information and metadata content information to the pending table and where the third logic detects file system transactions that change metadata in the active file system, produces a batch of transactions, and presents the batch of transactions to the pending table.

15. The apparatus of claim 14, comprising a fifth logic configured to perform inode maintenance, inode conversion, or inode defragmentation while the active file system remains active.

16. A system, comprising:
- means for preserving the structure and contents of metadata for a file system using a comprehensive inbound file system metadata investigator, where the comprehensive inbound file system metadata investigator preserves the structure and contents of metadata for the file system by flattening the structure and contents into table structures;
- means for maintaining the structure and contents of metadata for the file system using a file system transaction detector; and
- means for restoring the structure and contents of metadata for the file system using a comprehensive outbound file system metadata placer and an on-demand outbound file system metadata placer,
- where the means for preserving, the means for maintaining, and the means for restoring operate at least partly in parallel, and
- where the means for preserving and the means for maintaining first update a pending write data store and then control the pending write data store to preserve and maintain the structure and contents of metadata by selectively updating a posted data store.

* * * * *